No. 747,530. PATENTED DEC. 22, 1903.
C. B. BOSWORTH.
DEVICE FOR TESTING PRESSURE GAGES.
APPLICATION FILED JULY 11, 1902.
NO MODEL.
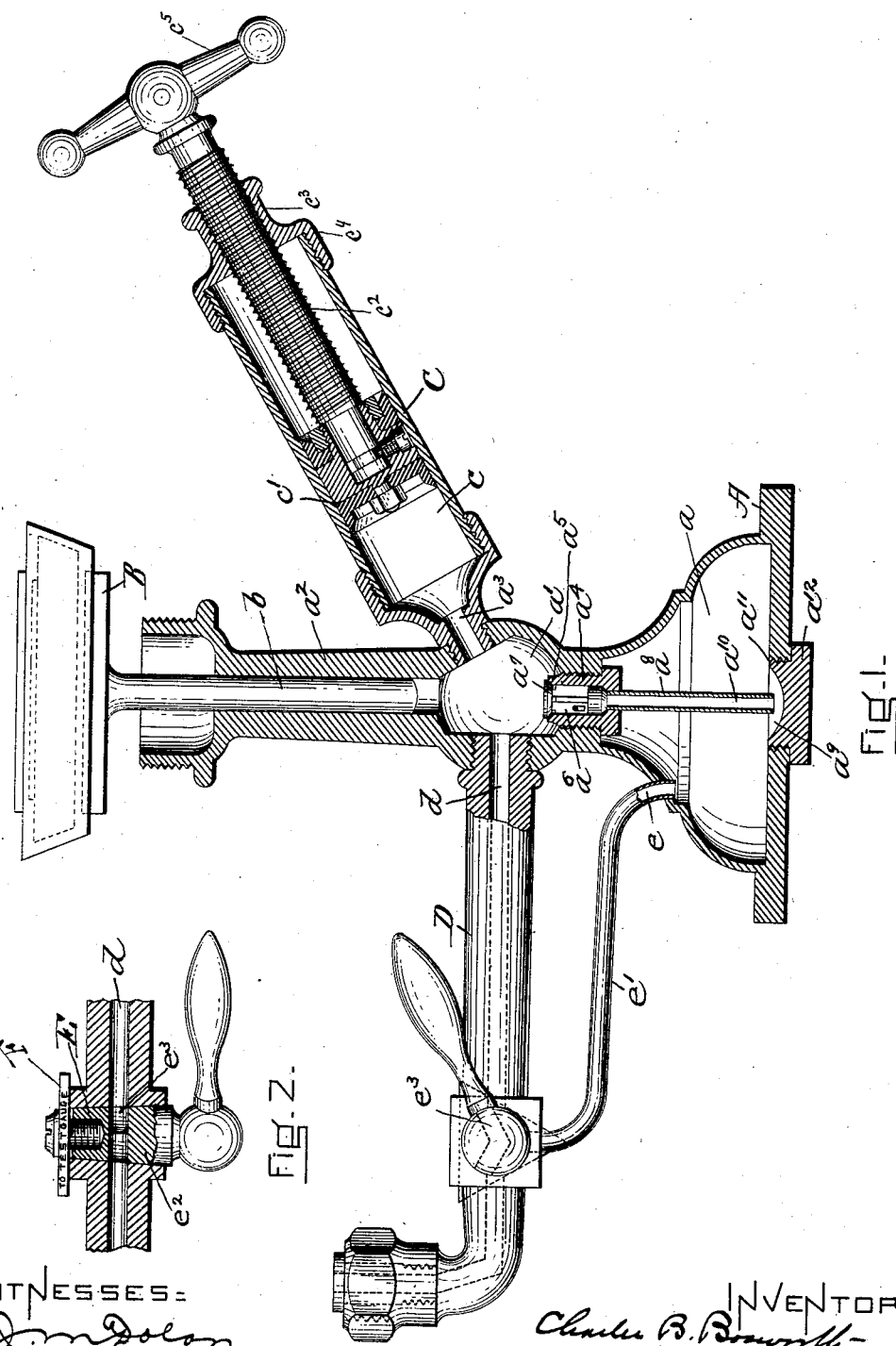

No. 747,530. Patented December 22, 1903.

UNITED STATES PATENT OFFICE.

CHARLES B. BOSWORTH, OF SOMERVILLE, MASSACHUSETTS, ASSIGNOR TO STAR BRASS MANUFACTURING COMPANY OF BOSTON, MASSACHUSETTS, A CORPORATION OF MASSACHUSETTS.

DEVICE FOR TESTING PRESSURE-GAGES.

SPECIFICATION forming part of Letters Patent No. 747,530, dated December 22, 1903.

Application filed July 11, 1902. Serial No. 115,150. (No model.)

*To all whom it may concern:*

Be it known that I, CHARLES B. BOSWORTH, a citizen of the United States, residing at Somerville, in the county of Middlesex and State of Massachusetts, have invented a new and useful Improvement in Devices for Testing Pressure-Gages, of which the following is a full, clear, and exact description, reference being had to the accompanying drawings, forming a part of this specification, in explaining its nature.

The invention relates to a device for testing pressure-gages and is an improvement upon the ordinary type of such devices.

It consists in providing the device, first, with a fluid-holding reservoir connected with a chamber common to the fluid-forcing apparatus, the fluid - pressure balancing or weighing means, and the gage, and, second, in means connecting the passage from the chamber to the gage with the said reservoir in such a manner as to provide for the return of the fluid from the gage to the reservoir instead of to the chamber, as is now common, and also in a manner to connect the chamber with the reservoir and at the same time shut out the gage and maintain such fluid-pressure therein as an operation of the device may have caused and in order that the pressure therein may be increased or added to by a subsequent operation of the device.

I will now describe the invention in conjunction with the drawings which form a part of this specification, and wherein—

Figure 1 is a view of a testing device provided with my improvements and showing the same in vertical section and in elevation. Fig. 2 is a view taken through the passage from the chamber to the gage upon a line with the valve therein and also showing the valve.

In the drawings, A represents the stand or frame of the testing device. Preferably it is made of cast-iron. It has in its base a fluid-holding reservoir $a$ for holding the fluid used in testing the gage, and above it it has a chamber $a'$, from which extends upward a vertical cylinder $a^2$, and which cylinder contains a rod or piston $b$, supporting upon its upper end a weight-holder B. The chamber $a'$ is also connected by a passage $a^3$ with the chamber $c$ of the pressure-cylinder C, containing the usual pressure-applying device. This comprises a piston $c'$ and a screw $c^2$, working in a nut $c^3$ in the cylinder-head $c^4$. The screw extends outside the head and is provided with a handle $c^5$, by means of which it is turned. The chamber $c$ is of a diameter to contain when the piston has been drawn out a sufficient supply of fluid for working the apparatus, as will hereinafter be described. The chamber $a'$ is also connected by a passage $d$ in a pipe D, which forms a bracket for supporting the pressure-gage to be tested, but which is not shown with said gage when it is mounted upon the end of the bracket, excepting as hereinafter stated. It will thus be seen that the chamber $a'$ is common to the reservoir, the pressure-applying device, the weighing piston or means, and the gage.

The fluid-holding reservoir $a$ has between it and the chamber $a'$ a check-valve, which opens to permit the fluid to be drawn by the outward movement of the pressure - piston into the chamber and which closes automatically after said fluid has been so drawn and is held closed during the reverse movement of the pressure - piston in forcing the fluid from the chamber $a'$ into the gage and against the weighing-piston.

The chamber $a'$ preferably is connected with the bottom of the reservoir in order that all the fluid contained therein may be utilized. The check - valve is constructed and the connection between the chamber and the bottom of the reservoir is obtained in the following manner: The passage between the reservoir and the chamber is threaded to receive and hold a sleeve $a^4$, which is screwed into it and the upper end of which is in the chamber $a'$ and has a valve-seat $a^5$. In it is mounted a slide check-valve $a^6$, terminating in the valve-seat $a^7$, which closes upon the sleeve valve-seat $a^5$. The extent of movement of the check-valve is limited in any desired way. The sleeve $a^4$ has attached to it a downward-extending pipe or tube $a^8$, the lower open end of which is contained in a depression $a^9$ in the bottom of the reservoir. The passage $a^{10}$ in this tube and in the sleeve connects the reservoir with the chamber $a'$. The outward movement of the pressure-piston $c'$ in its chamber $c$ causes the check-valve to be lifted and the testing fluid to flow from its reservoir through the passage $a^{10}$ into the chambers $a'$ $c$ and the passages therefrom. The check-valve automatically closes at the end of this fluid-drawing action of the piston, and a reverse movement of the piston will of course act to hold the check-valve closed, and thus shut off the connection between the reservoir and the chamber $a'$ during the testing of a gage.

The passage $d$ in the bracket-pipe D is connected by a passage $e$ in the pipe $e'$ with the reservoir $a$. A valve E is arranged in the bracket-pipe at its intersection with the pipe $e'$. This valve is, in effect, a three-way valve in that it serves to open the passage $d$ from the chamber $a'$ to the gage when it closes the passage $e$ from the passage $d$ to the reservoir or to open a passage from the gage to the reservoir by means of the part of the passage $d$ beyond the valve and the passage $e$ when it serves to close that portion of the passage $d$ between it and the chamber and in that it serves to connect the chamber $a'$ with the reservoir $a$ by means of the portion of the passage $d$ between the valve and the chamber and the passage $e$ and when the valve acts to close the portion of the passage $d$ between it and the gage. The first of these actions is the one which the valve occupies when the piston is being operated to force the testing fluid into the gage and against the weighing-piston. The second position of the valve insures the discharge or escape of the testing fluid from the gage directly to the fluid-holding reservoir $a$. The third position of the valve provides for accumulative action of the tester in that it permits the use of two or more charges for testing the same gage and for holding the charges in the gage while a new charge is being drawn by the pressure-piston from the reservoir.

The reservoir is shown as provided with a filling-hole $a^{11}$ in its bottom, which is closed by a screw plug or cap $a^{12}$, and the upper end of this cap is represented as provided with a cavity $a^9$, within which the lower end of the tube $a^{10}$ may extend.

The testing device, excepting as above indicated, is used in the ordinary way of such devices. The employment of a reservoir for holding the testing fluid and its connection with the main chamber and the gage-passage and the employment of a three-way valve all serve to contribute means whereby the efficiency of the device is increased and an economy in its use secured.

I have represented the three-way valve as having a triangular washer, upon the edge faces of which are directions for indicating the various connections which the valve makes when said faces are uppermost, (see Fig. 2,) where F represents the triangular washer, with the words "To test gage" on its upper or exposed face and which indicates that the valve is then in a position to open the connection between the chamber $a'$ and the gage.

The operation of the device is as follows: The gage the spring of which is to be tested is mounted upon the gage-holder at the end of the bracket-pipe D. The valve E is turned to close the passages $d$ and $e$ to the gage. The piston $c'$ is then near its innermost position in the cylinder, thereby reducing the capacity of the chamber $c$ to very nearly its smallest extent. The pressure fluid, preferably oil, is contained in the reservoir $a$ and is under atmospheric pressure only. The piston is then moved outward in the chamber $c$ slowly by turning the screw $c^2$ by hand. This causes the fluid to be drawn from the reservoir $a$ and to enter the chamber $a'$ and the chamber $c$ in the cylinder. The capacity of the reservoir and of this chamber is only sufficient for a single charge of the apparatus. The chamber $c$, having thus been enlarged and filled to the desired extent, the valve E is then turned to open the passage $d$ to the gage-tube and to close the passage $e$ from the passage $d$ to the reservoir. The movement of the piston $c'$ is then reversed by the turning of the screw $c^2$, which slowly moves the piston in the cylinder against the fluid and with any stress desired, forcing it from the cylinder $c$ through the chamber $a'$ into the passages $a^2$ $d$ and into the Bourdon tube. The degree of pressure desired having been reached, the pressure may be maintained in these chambers and passages and the tube as long as may be desired without further movement of the piston. The pressure in the distributing-chamber $a'$ varies with that of the pressure in the chamber $c$ and cannot be augmented excepting by the inward forcing movement of the piston $c'$, which affects the pressure in all the chambers and passages of the apparatus which are open to it. The repetition of the movement of the piston would effect no increase in the pressure or add fluid to the chambers unless the piston were drawn outward in the chamber $c$ farther than it was drawn upon its first outward movement. The gage-spring thus having been tested, the valve E is then turned to permit the fluid to run back of its own weight from the gage-tube and the part of the passage $d$ beyond the valve into the reservoir, where it is again held at atmospheric pressure until it is again drawn into the chamber $a'$ and cylinder $c$ by the outward movement of the piston $c'$ in preparation for the testing of another gage. The check-valve $a^7$ opens automatically to permit the piston to draw the fluid from the reservoir into the chambers $a'$ $c$ and continues open so long as there is draft exerted by the piston. When, however, the movement of the piston is reversed to exert pressure upon the fluid which it has drawn, the valve automatically closes the connection with the reservoir.

Having thus fully described my invention, I claim and desire to secure by Letters Patent of the United States—

1. In a portable device for testing gages or similar instruments, a casing containing a distributing-chamber, an exhaust receiving and supply chamber, pressure-weighing means connected with said distributing-chamber, a gage-holder, a passage connecting said gage-holder with said distributing-chamber, a second passage connecting a point in said first-named passage intermediate the gage-holder and distributing-chamber with said exhaust receiving and supply chamber, a valve located at the junction of said passages whereby said distributing-chamber may be connected at will with said gage-holder or said exhaust receiving and supply chamber, and a third passage connecting said exhaust receiving and supply chamber with said distributing-chamber, said passage being normally closed, and means whereby said distributing-chamber may be filled through said third passage from said exhaust receiving and supply chamber.

2. In a portable device for testing gages or similar instruments, the combination of an exhaust receiving and supply chamber in the body of the device, a distributing-chamber in communication therewith, a check-valve between the two chambers opening away from the exhaust receiving and supply chamber, a gage-holder communicating with the distributing-chamber, pressure-weighing means, communicating passages from the weighing means to the distributing-chamber, and pressure-applying means in operative relation to the distributing-chamber and its various connections for operating the check-valve to supply the distributing-chamber, and then applying the pressure to the weighing means and gage-holder.

3. In a portable device for testing gages or similar instruments, the combination of an exhaust receiving and supply chamber in the body of the device, a distributing-chamber in connection therewith, a check-valve between the two chambers opening away from the exhaust receiving and supply chamber, a gage-holder, a passage from the gage-holder to the distributing-chamber, a second passage from a point intermediate the holder and distributing-chamber in the aforesaid passage to the exhaust receiving and supply chamber, a valve at the junction of the two passages whereby the holder and distributing-chamber may be exhausted to the exhaust receiving and supply chamber, pressure-weighing means, communicating passages from the weighing means to the distributing-chamber, and pressure-applying means in operative relation to the distributing-chamber and its various connections for operating the check-valve to supply the distributing-chamber, and then applying the pressure to the weighing means and gage-holder.

4. In a device for testing gages or similar instruments, the combination of an exhaust receiving and supply reservoir for holding a charge of fluid at constant normal pressure, a distributing-chamber with which said reservoir connects, a gage-holder having a passage extending from said chamber to the gage, a pressure-weighing means having a passage connecting with said chamber, a single-acting, non-accumulative, fluid charging and forcing device also connected with said chamber, having a fluid-holding capacity which with that of the chamber is sufficient to receive and hold a single operative charge for testing the gage, a fluid draft and forcing piston forming part of the fluid charging and forcing device, a single movement of which in one direction is sufficient to draw into the distributing-chamber and its chamber from the reservoir a charge of fluid and a single movement of which in the reverse direction applies direct pressure to the fluid, the gage, and the pressure-weighing means, an automatic valve between the reservoir and the distributing-chamber, an exhaust-passage extending from the passage of the gage-holder to said reservoir, and a three-way valve at the intersection of said passages, common to both and constructed to close the exhaust-passage to the reservoir and open the gage-holder passage, or to close the gage-holder passage and connect the gage with the reservoir, or to shut off the gage and connect the distributing-chamber with the reservoir.

5. In a gage-tester having a gage-holder, a pressure-weighing means, a fluid-forcing device and a chamber common to them all, a reservoir, a sleeve between the reservoir and the chamber having at its upper end a valve-seat and also having a tube extending to near the bottom of the reservoir, and a valve mounted in said sleeve to be movable vertically therein having a valve-seat to close upon the valve-seat of the sleeve.

6. In a gage-testing device, in combination with a chamber, a fluid-forcing device, a fluid-weighing means, a gage-holder and a passage extending from the chamber to the gage-holder, a reservoir connected with the chamber and with the passage, a three-way valve at the intersection of the passage and the reservoir connection having a triangular washer, the edge faces of which bear indications as to the location of the valve.

7. In a portable device for testing gages or similar instruments, a casing containing in its base an exhaust receiving and supply chamber, a distributing-chamber located above said exhaust receiving and supply chamber, a pressure-weighing means also connected with said distributing-chamber and located above it, a passage normally closed connecting said exhaust receiving and supply chamber with said distributing-chamber, means for filling said distributing-chamber from said exhaust receiving and supply chamber, a gage-holder, a passage connecting said gage-holder with said distributing-chamber, a second passage connecting said first-named passage with said exhaust receiving and supply chamber, and a valve located at the junction of said passages whereby said distributing-chamber may be connected with either said gage-holder or said exhaust receiving and supply chamber.

CHARLES B. BOSWORTH.

Witnesses:
F. F. RAYMOND, 2d,
SAUL SIPPUSTEIN.